Dec. 6, 1927.  
E. J. KOLODZIEJ  
1,651,895  
SHOCK ABSORBER  
Filed July 14, 1926
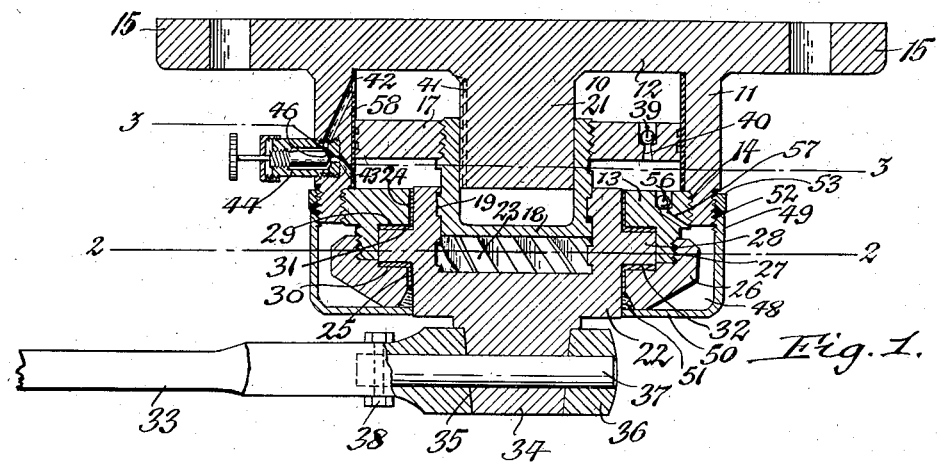
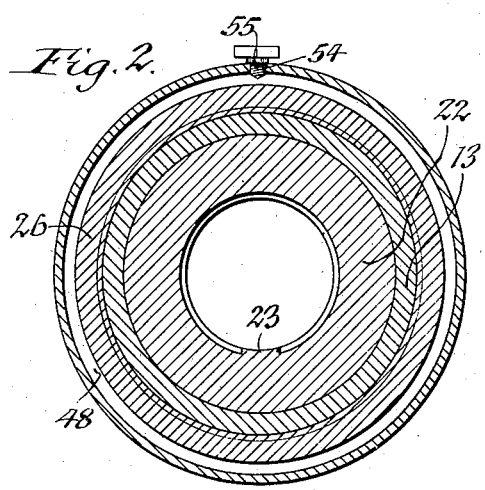
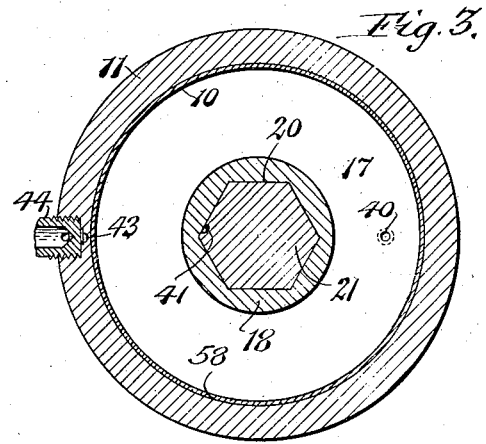
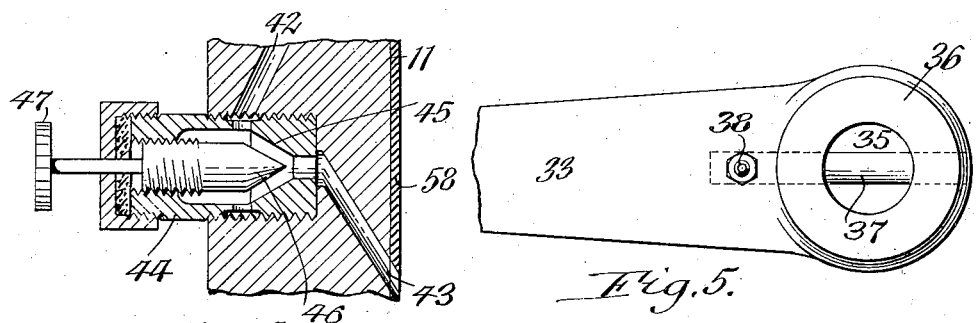
Inventor  
Edward J. Kolodziej  
By Poppe & Powers  
Attorneys Patented Dec. 6, 1927.

1,651,895

UNITED STATES PATENT OFFICE.

EDWARD J. KOLODZIEJ, OF BUFFALO, NEW YORK.

SHOCK ABSORBER.

Application filed July 14, 1926. Serial No. 122,318.

This invention relates to a shock absorber of the type in which a piston is caused to wave lengthwise in a pressure chamber containing a liquid resistant by means of a rotary screw nut journaled on the pressure chamber and having a screw connection with said piston.

It is the object to provide a shock absorber of this character which is simple and durable in construction, reliable in operation, capable of being manufactured economically, and not liable to get out of order under severe usage.

In the accompanying drawings:
Figure 1 is a longitudinal section of a shock absorber embodying my improvements. Figures 2 and 3 are transverse sections taken on the correspondingly numbered lines in Fig. 1. Figure 4 is a fragmentary section on an enlarged scale of the valve mechanism for controlling the by-pass leading from one end of the pressure chamber to the other. Figure 5 is a front view of the rock arm for actuating the shock absorber.
Similar characters of reference indicate like parts on the several figures of the drawings.

The numeral 10 represents the pressure chamber of the shock absorber which is adapted to contain a liquid pressure resistant such as oil. The chamber in its preferred form comprises a peripheral wall 11 of cylindrical form, a rear head 12 formed integrally with the rear end of the wall 11 and a front head 13, which is connected by a screw joint 14 with the front end of said wall. On its diametrically opposite sides the rear end of the pressure chamber wall is provided with laterally projecting legs 15, whereby the same is adapted to be attached to one of the relatively movable parts which are to be cushioned, for example, the frame of an automobile.

Reciprocating lengthwise within the pressure chamber is a piston 17, which is provided on its central part with a forwardly projecting hollow stem 18, the periphery of which has an external screw thread 19 and the bore 20 of which is of hexagonal or other non-circular form in cross section.

Projecting forwardly from the central part of the rear pressure chamber head and preferably formed integrally therewith as shown in Fig. 1 is a guide shank 21, which is of non-circular form in cross section, for example, hexagonal, so as to fit the bore of the piston stem which receives it and thereby permits the piston to slide lengthwise in the pressure chamber but prevents the same from turning therein.

Journaled on the front head of the pressure chamber is a rotatable screw nut 22 which has an internal screw thread 23 engaging with the external thread of the piston stem, so that upon oscillating the screw nut the piston will be moved back and forth in the pressure chamber. This nut is mounted to rotate but held against axial movement by arranging the rear peripheral part of the nut in the bore 24 in the front pressure chamber head and its front peripheral part in the bore 25 of a retaining ring 26 which is connected by a screw joint 27 with the front pressure chamber head, and providing said nut between its front and rear peripheral parts with an external annular flange 28 which is arranged between a forward facing annular shoulder 29 on the front pressure chamber head and a rearwardly facing annular shoulder 30 on the retaining ring. In order to reduce the wear upon the co-operating surfaces of the screw nut and front head and retaining ring two wearing rings 31, 32 are employed, each of which is of L shape in cross section, the rear ring 31 being arranged between the rear peripheral part of the screw nut and the rear side of its flange and bore of the front head and its forwardly facing shoulder, and the front wearing ring 32 being arranged between the front peripheral part of the screw nut, the front side of its flange and the bore of said retaining ring and the rearwardly facing shoulder thereof.

A rocking or oscillating movement is imparted to the screw nut by means of a rock arm 33 attached to the front end of the screw nut and connected with another relatively movable part, for example, the axle of an automobile. In order to reliably connect the rock arm with the screw nut the latter is provided with a forwardly projecting stud 34 of conical form which enters a correspondingly shaped opening 35 in the hub 36 of this arm. These parts are prevented from becoming accidentally detached by a fastening pin 37 passing diametrically through said hub and stud and the adjacent part of the arm, and a locking bolt 38 passing transversely through said arm and fastening pin.

As the piston is moved backwardly the liquid in the rear part of the pressure chamber offers the greatest resistance because its escape is restricted, but during the forward movement of the piston the liquid in the pressure chamber in front of the piston is permitted to escape comparatively freely, thereby causing the shock absorber to exert a light cushioning effect when depressing the springs of a car, but a greater cushioning effect when the springs rebound. This is accomplished in part by a check valve 39 which is arranged in a port 40 in the piston and which closes said port during the rearward movement of the piston so as to confine the liquid in rear of the same and opens the same during the forward movement of the piston so as to permit ready escape of the liquid in front of the piston to the rear side of the same.

Partial escape of the resistance fluid from the rear end of the pressure chamber is permitted by a permanent by-pass groove 41 arranged in the side of the guide shank and extending from the rear end of the pressure cylinder to the interior of the screw nut. Adjustable by-pass means are also provided consisting of an auxiliary by-pass having front and rear sections 42, 43 forward in the pressure chamber wall and communicating with the front and rear ends of the pressure chamber a tubular valve body 44 screwed into the wall of said chamber and having a conical seat 45 between a front port at its inner end which communicates with the front by-pass section 42, and a side opening which communicates with the rear by-pass section 43, and a conical valve 46 having a screw connection with the body 44 and a handle 47 for turning the same so that the space between the valve at its seat may be varied in capacity and the by-passing effect of the auxiliary by-pass regulated in accordance with requirements.

The supply of liquid resistance is automatically replenished from a liquid storage chamber 48 which is arranged in front of the pressure chamber and which preferably is formed by a peripheral wall 49 surrounding the front head and retaining ring and having a screw connection at its rear end with the front end of the pressure chamber wall and an inwardly projecting flange 50 arranged at the front end of this storage chamber wall and engaging the front side of the retaining ring and surrounding the screw nut. A leak tight joint is produced between this flange and the adjacent parts of said retaining ring and screw nut by a packing ring 51 interposed between these parts. Leakage is prevented between the storage chamber and pressure chamber walls by a packing ring 52 interposed between the rear end of the storage chamber wall and a clamping ring 53 screwed into the exterior of the pressure chamber wall. The storage chamber is filled with oil or other resistance fluid through a filling opening 54 in its top which is normally closed by a screw plug 55, as shown in Fig. 2. When the resistance liquid in the pressure chamber needs replenishing a check valve 56 automatically opens a replenishing passage 57 leading through the front pressure chamber head from the storage or supply chamber to the front end of the pressure chamber, which valve again closes automatically when the required amount of liquid has been transferred from the supply chamber to the pressure chamber, thereby constantly maintaining a normal amount of pressure resisting liquid in the pressure chamber and causing the shock absorber to operate uniformly at all times.

In the preferred construction the cylindrical wall of the pressure chamber is lined with a bushing 58 of tempered steel, thereby causing the cylinder to wear longer and avoid any binding action of the piston therein.

This shock absorber is not only simple in construction and efficient in operation but the same is also very compact, readily adapted to varied loads and not liable to get out of order.

I claim as my invention:

1. A shock absorber comprising a pressure chamber adapted to contain a liquid resistant and having a cylindrical wall, a rear head connected with the rear end of said wall and a front head having a screw connection with the front end of said wall and provided with a central opening and a forwardly facing annular shoulder in said opening, a retaining ring having a screw connection with said front head and provided with an annular rearwardly facing shoulder, a rotatable screw nut arranged within said front head and retaining ring, and having an external annular flange arranged between said forwardly and rearwardly facing shoulders and an internal screw thread, a piston reciprocating lengthwise in said cylinder and having a hollow stem provided with an external screw thread engaging with the internal thread of said nut and having a non-circular bore, a shank projecting forwardly from said rear wall and having a non-circular periphery engaging with the non-circular bore of said stem, a liquid storage chamber arranged in front of said pressure chamber and having a peripheral wall connected by a screw joint with said pressure chamber wall and an annular flange at the front end of said storage chamber wall and engaging with said retaining ring, and a check valve arranged in said front pressure chamber head and permitting flow only from said storage chamber to said pressure chamber.

2. A shock absorber comprising a pressure chamber adapted to contain a liquid resistant and having a cylindrical wall, a rear head connected with the rear end of said wall and a front head having a screw connection with the front end of said wall and provided with a central opening and a forwardly facing annular shoulder in said opening, a retaining ring having a screw connection with said front head and provided with an annular rearwardly facing shoulder, a rotatable screw nut arranged within said front head and retaining ring, and having an external annular flange arranged between said forwardly and rearwardly facing shoulders and an internal screw thread, a piston reciprocating lengthwise in said cylinder and having a hollow stem provided with an external screw thread engaging with the internal thread of said nut and having a non-circular bore, a shank projecting forwardly from said rear wall and having a non-circular periphery engaging with the non-circular bore of said stem, a liquid storage chamber arranged in front of said pressure chamber and having a peripheral wall connected by a screw joint with said pressure chamber wall and an annular flange at the front end of said storage chamber wall and engaging with said retaining ring, a check valve arranged in said front pressure chamber head and permitting flow only from said storage chamber to said pressure chamber, and a packing arranged between the storage chamber flange and said retaining ring and screw nut.

3. A shock absorber comprising a pressure chamber adapted to hold a liquid resistant and having a peripheral wall, a rear head and a front head, a piston reciprocable lengthwise in said chamber and having a screw threaded stem, a rotatable screw nut journaled in said front head and having a forwardly projecting stud, an operating arm having a hub which receives said stud, a fastening pin passing diametrically through said hub and stud and into the adjacent part of said arm, and a locking bolt passing transversely through said arm and the adjacent part of said fastening pin.

In testimony whereof I hereby affix my signature.

EDWARD J. KOLODZIEJ.